US008116498B2

(12) United States Patent
Akino et al.

(10) Patent No.: US 8,116,498 B2
(45) Date of Patent: Feb. 14, 2012

(54) CONDENSER MICROPHONE

(75) Inventors: Hiroshi Akino, Machida (JP); Shioto Okita, Machida (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 1098 days.

(21) Appl. No.: 12/000,120

(22) Filed: Dec. 10, 2007

(65) Prior Publication Data

US 2008/0159576 A1 Jul. 3, 2008

(30) Foreign Application Priority Data

Dec. 27, 2006 (JP) ................................ 2006-351190

(51) Int. Cl.
*H04R 9/08* (2006.01)
*H04B 15/00* (2006.01)

(52) U.S. Cl. ....................................... 381/355; 409/101

(58) Field of Classification Search .................. 381/355; 439/101, 607, 921

See application file for complete search history.

(56) References Cited

U.S. PATENT DOCUMENTS 6,704,430 B2 * 3/2004 Imahori et al. ................ 381/396
7,054,458 B2 * 5/2006 Ito et al. ......................... 381/355
2006/0285707 A1 * 12/2006 Izuchi et al. ................. 381/191

FOREIGN PATENT DOCUMENTS

JP S55-105492 8/1980
JP H05-006999 1/1993
JP H05-057853 9/1993
JP 2006-304049 11/2006

* cited by examiner

*Primary Examiner* — Phuc Dang
(74) *Attorney, Agent, or Firm* — Manabu Kanesaka

(57) ABSTRACT

A condenser microphone includes a unidirectional microphone unit including a cylindrical metallic unit case having a front audio terminal on a front surface and a rear audio terminal on a side surface; an acoustoelectric converter having a diaphragm and a backplate, disposed in the metallic unit case; and a metal mesh covering a rear audio terminal from an inside of the unit case. A coil spring having an outside diameter larger than an inside diameter of the unit case is disposed in the unit case to thereby press the metal mesh against the inner wall surface of the unit case to contact the metal mesh with the unit case.

3 Claims, 1 Drawing Sheet

CONDENSER MICROPHONE

TECHNICAL FIELD

The present invention relates to a condenser microphone and, more particularly, to a technique for preventing the generation of noise caused by disturbance electromagnetic waves.

BACKGROUND ART

FIG. 2 is a sectional view showing a general configuration example of a microphone unit that a conventional condenser microphone has. This microphone unit 10B is unidirectional, and in this example, there is shown a microphone unit that is attachable to and detachable from a microphone body, not shown, (exchangeable), which microphone unit is applied to tie clip microphones, gooseneck microphones, and the like.

The microphone unit 10B includes a cylindrical unit case 20 formed of, for example, a brass alloy. In the unit case 20, a diaphragm and a backplate are arranged opposedly via a spacer ring (all of the three elements are not shown) as well known, and an electrostatic acoustoelectric converter 30 for converting coming sound waves into electrical signals is housed.

Since the microphone unit 10B is unidirectional, the unit case 20 is provided with a rear audio terminal (rear sound wave introduction port) 22, which takes in velocity components, on the side surface side thereof in addition to a front audio terminal (front sound wave introduction port directed to a sound source) 21 provided on the front surface thereof.

Usually, in the unit case 20, a metal mesh 40 for covering the rear audio terminal 22 from the inside is provided. This metal mesh 40 is provided to inhibit foreign matters from intruding into the unit case 20 from the rear audio terminal 22. The metal mesh 40 is brought into contact with the inner wall surface of the unit case 20 by the spring property of the metal mesh 40 itself, and is fixed by using an adhesive to prevent the metal mesh 40 from coming off due to vibrations etc. For example, Patent Document 1 (Japanese Patent Application Publication No. S55-105492) or Patent Document 2 (Japanese Patent Application Publication No. S56-43985) should be referred to.

On the inner surface side of the front audio terminal 21 as well, a metal mesh for inhibiting the intrusion of foreign matters is provided in the same way, but the illustration of this metal mesh is omitted.

From the acoustoelectric converter 30, a signal draw-out electrode 31 connected to the backplate is drawn out. Along with the connection of the microphone unit 10B to the microphone body, the signal draw-out electrode 31 is connected to a sound output circuit, not shown, in the microphone body. Since the acoustoelectric converter 30 has a very high impedance, an impedance converter is provided on the input side of the sound output circuit.

A vacuum tube is used as the impedance converter on rare occasions. In most cases, however, a field effect transistor (FET) is used as the impedance converter. In this case, the signal draw-out electrode 31 is connected to the gate electrode of the FET, and the sound output circuit is connected to between the source and the drain of the FET.

Since the impedance converter of this type also acts as a wave detecting device, if a high-frequency current caused, for example, by electromagnetic waves is applied to the microphone unit 10B as disturbance, the current is detected by the impedance converter, and thereby noise of audio frequency is generated. The noise of this kind is scarcely generated in the case where the electromagnetic shield of the microphone unit 10B is ensured.

At the front audio terminal 21, the diaphragm is arranged so as to be opposed to the front audio terminal 21, and a metallic layer formed in the diaphragm is connected to the unit case 20, which provides grounding, via a metallic support ring (diaphragm ring), so that the electromagnetic waves intruding from the front audio terminal 21 rarely pose a problem.

However, regarding to the rear audio terminal 22, the contact between the metal mesh 40 covering the rear audio terminal 22 from the inside and the inner wall surface of the unit case 20 depends on only the spring property of the metal mesh 40 itself as described above, so that the contact point area is small, and therefore the shield property is not necessarily sufficient.

In recent years, cellular phones have come into wide use. The cellular phone emits considerably strong electromagnetic waves (for example, within the range of about several centimeters to several tens centimeters, a field intensity reaching tens of thousands times of field intensity produced in the city by commercial electric waves).

Therefore, if a cellular phone is used near the microphone, since the contact between the metal mesh 40 and the unit case 20 is insufficient, the contact portion has a high impedance in terms of high frequency, so that a high-frequency current caused by the high impedance intrudes into the microphone body, which may generate loud noise.

Also, since the contact state differs from microphone unit to microphone unit, the degree of generation of noise caused by high-frequency current varies. Also, if the opening of the rear audio terminal 22 is made large to improve the acoustic characteristics, the high-frequency current intrudes more easily.

Accordingly, an object of the present invention is to ensure the electromagnetic shield at a rear audio terminal covered by a metal mesh in a unidirectional microphone unit.

SUMMARY OF THE INVENTION

To achieve the above object, the present invention provides a condenser microphone including a unidirectional microphone unit incorporating an acoustoelectric converter, in which a diaphragm and a backplate are arranged opposedly via a spacer member, in a cylindrical metallic unit case having a front audio terminal on the front surface thereof and a rear audio terminal on the side surface thereof, in which a metal mesh covering the rear audio terminal from the inside is provided in the unit case, wherein a coil spring which presses the metal mesh against the inner wall surface of the unit case is provided in the unit case.

According to this configuration, the metal mesh covering the rear audio terminal from the inside is pressed against the inner wall surface of the unit case by the coil spring, so that the metal mesh comes into contact with the unit case at many points, and thereby a reliable electromagnetic shield can be provided. Also, the need for fixing the metal mesh by using an adhesive is eliminated.

As a further preferable mode, the coil spring is plated with gold.

According to this configuration, since the coil spring is plated with gold, the contact resistance between the coil spring and the metal mesh is decreased extremely, and the contact portion has no impedance in terms of high frequency.

DETAILED DESCRIPTION

Figure 1:
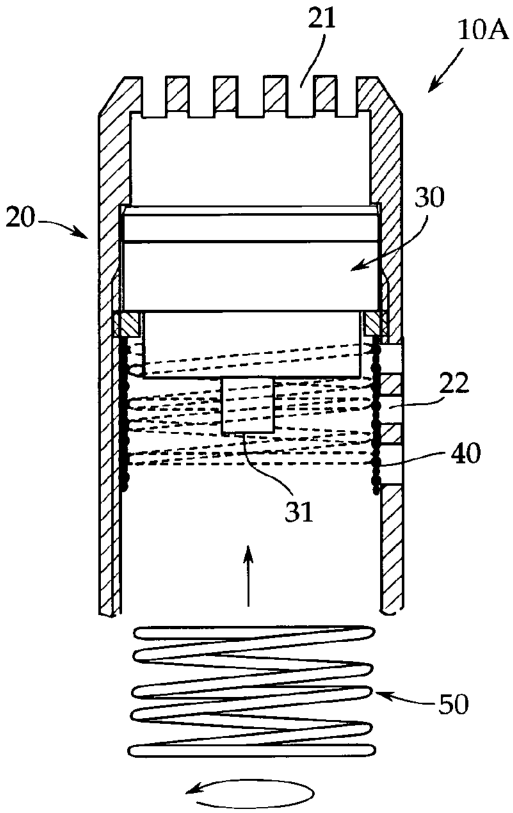
FIG. 1 is a sectional view of a microphone unit that a condenser microphone in accordance with the present invention has.

An embodiment of the present invention will now be described by reference to FIG. 1. The present invention is not limited to this embodiment. FIG. 1 is a sectional view of a microphone unit that a condenser microphone in accordance with the present invention has. In the explanation of this embodiment, the same reference numerals are applied to elements that are the same as those in the conventional example explained by reference to FIG. 2.

Figure 2:
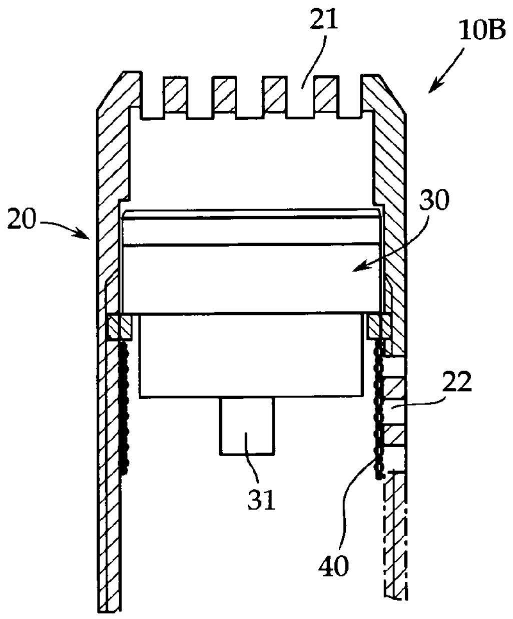
FIG. 2 PRIOR ART
FIG. 2 is a sectional view of a conventional microphone unit.

As shown in FIG. 1, in this microphone unit 10A as well, as in the conventional example explained by reference to FIG. 2, a cylindrical unit case 20 formed of, for example, a brass alloy is provided. In the unit case 20, a diaphragm and a backplate are arranged opposedly via a spacer ring (all of the three elements are not shown) as well known, and an electrostatic acoustoelectric converter 30 for converting coming sound waves into electrical signals is housed.

Since the microphone unit 10A is unidirectional, the unit case 20 is provided with a front audio terminal (front sound wave introduction port directed to a sound source) 21 provided on the front surface thereof and a rear audio terminal (rear sound wave introduction port) 22, which takes in velocity components, provided on the side surface side thereof. The sound waves coming from the rear audio terminal 22 pass through a predetermined path in the electrostatic acoustoelectric converter 30 and act on the back surface side of the diaphragm.

The microphone unit 10A is attachable to and detachable from a microphone body, not shown, (exchangeable). A signal draw-out electrode 31 drawn out of the acoustoelectric converter 30 is connected to the gate terminal of an FET, serving as an impedance converter, provided on the microphone body side.

In the unit case 20, a metal mesh 40 for covering the rear audio terminal 22 from the inside is provided to inhibit foreign matters from intruding into the unit case 20 from the rear audio terminal 22. On the inner surface side of the front audio terminal 21 as well, a metal mesh for inhibiting the intrusion of foreign matters is provided in the same way, but the illustration of this metal mesh is omitted.

The metal mesh 40 is cut out of a net base material, not shown, into a rectangular shape having a length corresponding the inner circumference length of the unit case 20, and is inserted into the unit case 20 in a state of being rounded into a cylindrical shape. The metal mesh 40 is brought into contact with the inner wall surface of the unit case 20 by the spring property of the metal mesh 40 itself. However, the contact point area is small, and therefore the shield property is not necessarily sufficient.

Accordingly, in the present invention, a coil spring 50 is pushed into the unit case 20, and is pushed strongly against the inner wall surface of the unit case 20, by which the metal mesh 40 is brought into contact with the unit case 20 at many points to improve the electromagnetic shield property.

As the coil spring 50, a compression coil spring having an outside diameter slightly larger than the inside diameter of the unit case 20 is used. The compression coil spring is pressed (forcedly inserted) coaxially into the unit case 20 preferably while being turned.

According to this configuration, the metal mesh 40 is pushed strongly against the unit case 20, and comes into contact with the unit case 20 at many points, so that the electromagnetic shield is ensured. Also, since the stress of the coil spring 50 is steady, there is no difference between microphone units. Also, an adhesive for fixing the metal mesh 40 is not needed.

Preferably, the coil spring 50 is plated with gold. Thereby, the contact resistance between the coil spring and the metal mesh is decreased extremely, and the contact portion has no impedance in terms of high frequency. Therefore, the generation of noise caused by electromagnetic waves can be prevented more effectively.

In the above-described embodiment, the microphone unit 10A is attachable to and detachable from the microphone body. However, the microphone unit 10A may be integrated with the microphone body.

The present application is based on, and claims priority from, Japanese Application Serial Number JP2006-351190, filed Dec. 27, 2006, the disclosure of which is hereby incorporated by reference herein in its entirety.

The invention claimed is:

1. A condenser microphone comprising:

a unidirectional microphone unit including a cylindrical metallic unit case having a front audio terminal on a front surface and a rear audio terminal on a side surface, an acoustoelectric converter having a diaphragm and a backplate, disposed in the metallic unit case, a metal mesh covering the rear audio terminal from an inside of the unit case, and a coil spring having an outside diameter larger than an inside diameter of the unit case, the coil spring being disposed in the unit case to thereby press the metal mesh against an inner wall surface of the unit case to contact the metal mesh with the unit case.

2. The condenser microphone according to claim 1, wherein the coil spring is plated with gold.

3. The condenser microphone according to claim 1, wherein the coil spring is a compression coil spring having a size such that the coil spring is coaxially forcibly inserted into the unit case.

* * * * *